J. W. Wheeler,
Windlass Water Elevator.
N° 55,025. Patented May 22, 1866.
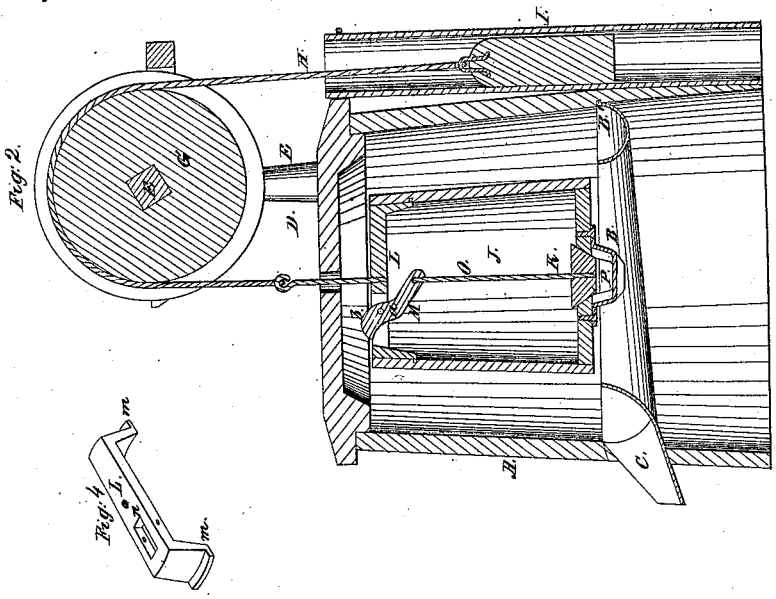
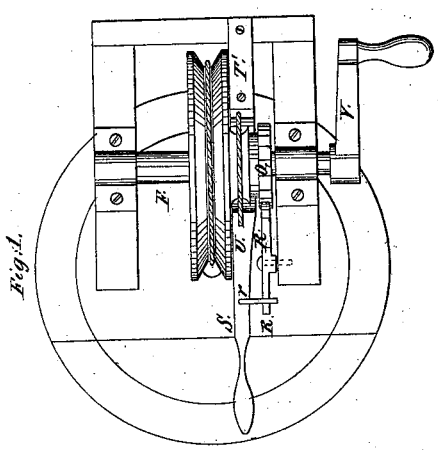
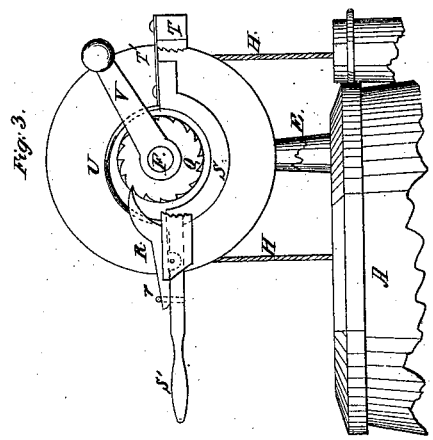
Witnesses:
Inventor:
J. W. Wheeler

UNITED STATES PATENT OFFICE.

JOHN W. WHEELER, OF CLEVELAND, OHIO, ASSIGNOR TO H. H. WHEELER AND S. R. BOARDMAN.

IMPROVEMENT IN WATER-DRAWERS.

Specification forming part of Letters Patent No. 55,025, dated May 22, 1866.

*To all whom it may concern:*

Be it known that I, J. W. WHEELER, of Cleveland, in the county of Cuyahoga and State of Ohio, have invented new and useful Improvements in Water-Drawers; and I do hereby declare that the following is a full and complete description of the construction and operation of the same, reference being had to the accompanying drawings, making part of this specification, in which—

Figure 1 is a top view. Fig. 2 is a vertical section. Fig. 3 is a side view of the windlass, pawl and ratchet, and brake, and Fig. 4 is a detached view of the bail.

Like letters refer to like parts in the several views.

The curb A, Figs. 2 and 3, is a tapering cylinder, largest at the bottom, and may be made of staves held together by hoops. B represents a circular spout, the upper and outer lip, B′, of which fits into a crossing or circular groove cut upon the inside of the curb A, as shown in Fig. 2. From the back side of the curb this circular trough B gradually increases in depth upon both sides till it reaches the discharging-spout C, which projects through the front side of the curb A.

The curb is provided with a cover, D, having a single hole in the center, for the passage of the chain or rope that supports the bucket. From this cover rises two posts, E, which support the windlass-shaft F.

G represents the windlass-wheel. H represents the rope that supports the bucket, and I represents the weight that balances the bucket, and J represents the bucket.

The bucket is round or cylinder-shaped, being the largest at the bottom. In the center of the bottom is placed a cone-valve opening upward, as seen at K, Fig. 2. The bail of the bucket is shown detached in Fig. 4, and is shown at L in Fig. 2. A circular groove or crossing is cut in the bucket, as shown at L′ in Fig. 2, into which the lips *m* of the bail L fit. The upper surface of the bail is even with the top of the bucket. The center of the bail is provided with a hole for securing the rope H. Upon one side of this hole there is a mortise, *n*, for receiving and holding the pivoted lever M. The short arm of this lever is curved upon the upper side and projects above the bail L. The pivot upon which it articulates passes through the bail, and is seen at *a*. A cord or rod, O, connects the valve K with the long arm of the lever M, and hence it follows that when the bucket is drawn up so that the curve *b* is brought into contact with the under side of the cover D the short arm of the lever is depressed and the long arm elevated, and by this movement the valve is opened.

A trough, P, which is open at both ends, is secured to the lower end of the bucket, by means of which the water is discharged from the bucket into the spout B, whatever may be the position of the bucket. The valve closes as the bucket descends, and on reaching the water the valve opens and admits the water into the bucket.

Q represents a ratchet-wheel upon the windlass-shaft F. R is a pawl which operates upon this ratchet-wheel. The pawl is pivoted to the frame T. S is a lever which is attached to the frame that supports the windlass-shaft, as seen at T, Figs 1 and 3, by a spring, T′. A brake, U, passes over an enlarged portion of the windlass-shaft, both ends of which are attached to the lever S. The pawl R has an arm, R′, extending outward from the pivot upon which it articulates, and a hook, *r*, reaches from the lever S, so as to embrace the arm R′, so that by depressing the lever S the pawl is raised out of the teeth of the ratchet-wheel, and at the same time the brake U is brought into contact with the enlarged portion of the windlass-shaft, and thus the descent of the bucket into the well is regulated at pleasure. By removing the hand from the lever S the spring T releases the brake and allows the pawl again to engage with the teeth of the ratchet-wheel, thus securing both ease and safety in the elevation and descent of the bucket, for when the lever S is not depressed the pawl remains engaged with the ratchet-wheel, and when the brake is applied the pawl is disengaged with the ratchet-wheel, thus securing the utmost safety in all the movements of the bucket.

V is a crank by which the windlass is operated.

What I claim as my improvement, and desire to secure by Letters Patent, is—

A water-elevator, as described, having a circular curb, A, and spout B, bucket J, with valve K and tripping-lever M, windlass G, with brake U, lever S, and hook *r*, all combined, arranged, and operating in the manner substantially as set forth.

JOHN W. WHEELER.

Witnesses:
SILAS B. STUART,
EDM. F. BROWN.